No. 835,344. PATENTED NOV. 6, 1906.
W. S. ANDREWS.
CURRENT RECTIFIER.
APPLICATION FILED AUG. 13, 1904.

2 SHEETS—SHEET 1.

Witnesses
Irving E. Steers.
Helen Orford

Inventor:
William S. Andrews.
by Albert G. Davis
Atty.

No. 835,344. PATENTED NOV. 6, 1906.
W. S. ANDREWS.
CURRENT RECTIFIER.
APPLICATION FILED AUG. 13, 1904.

2 SHEETS—SHEET 2.

Witnesses:
Irving E. Steen.
Helen Oxford

Inventor,
William S. Andrews.
by Albert G. Davis
Att'y.

UNITED STATES PATENT OFFICE.

WILLIAM S. ANDREWS, OF SCHENECTADY, NEW YORK, ASSIGNOR TO GENERAL ELECTRIC COMPANY, A CORPORATION OF NEW YORK.

CURRENT-RECTIFIER.

No. 835,344.　　　　Specification of Letters Patent.　　　　Patented Nov. 6, 1906.

Application filed August 13, 1904. Serial No. 220,602.

*To all whom it may concern:*

Be it known that I, WILLIAM S. ANDREWS, a citizen of the United States, residing at Schenectady, county of Schenectady, State of New York, have invented certain new and useful Improvements in Current-Rectifiers, of which the following is a specification.

The operation of the so-called "aluminium" rectifier is based on a peculiar property of aluminium when used as an electrode in certain electrolytes. If an aluminium plate is used as anode in a cell containing a solution of certain well-known salts, practically no current will flow through the cell, except during a very short interval of time after the pressure is applied. It is generally supposed that this resistance to the flow of current is caused by a thin layer of aluminium oxid formed on the aluminium plate by this small initial current. This film of oxid, while extremely thin, serves to prevent an appreciable flow of current from the plate to the electrolyte; but if the impressed pressure is reversed in direction, so that the aluminium plate becomes the cathode of the cell, the oxid immediately breaks down, due probably to the reducing action of the current, and the current flows freely through the cell. If an alternating current of low voltage is impressed on such a cell, the current will flow during each alternate half-cycle, but will be almost wholly prevented from flowing during the other half-cycle, so that the resultant current through the cell will be a pulsating unidirectional current flowing toward the aluminium. A device which thus allows current to pass freely in one direction, but substantially prevents the flow in the opposite direction, is commonly called an "asymmetric" conductor.

It is the object of the present invention to provide a rectifying device of novel construction so connected to a polyphase circuit as to convert into direct current the alternating current of each phase.

Figure 1:
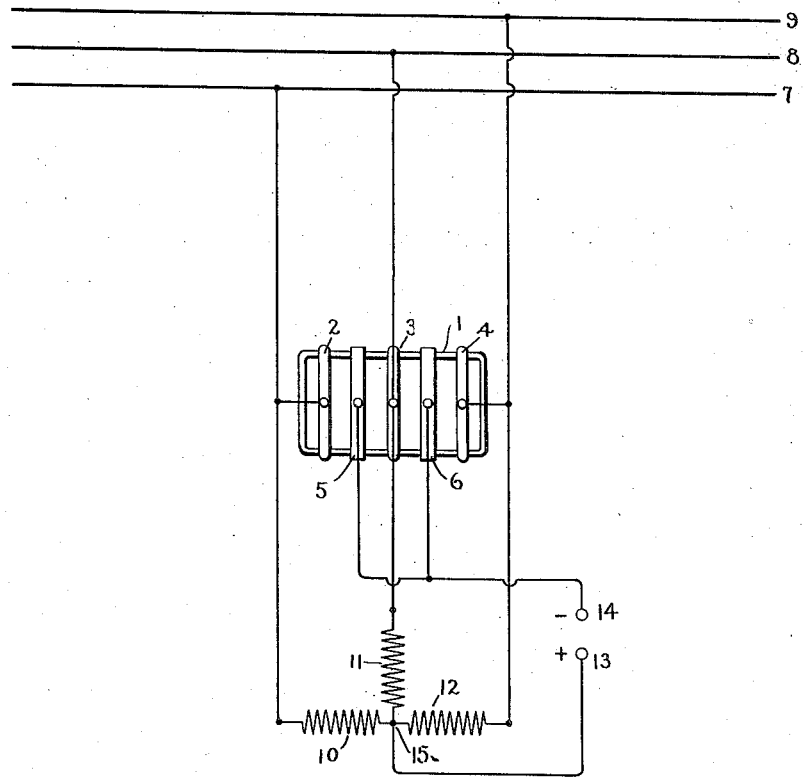
Figure 2:
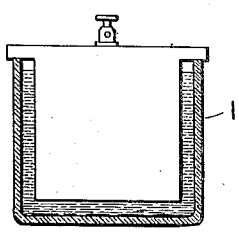

In the drawings, Figure 1 is a plan view of the cell and a diagram of the connections. Fig. 2 is an end section of the cell, and Fig. 3 is a modification in which asymmetric cells are substituted for the reactance-coils shown in Fig. 1.

The insulating-jar 1 contains a half-saturated solution of Rochelle salt, in which are immersed three aluminium plates 2, 3, and 4 and two carbon plates 5 and 6, each carbon plate being interposed between two of the aluminium plates. The three aluminium plates 2, 3, and 4 are connected, respectively, to the line-wires 7, 8, and 9 of the three-phase circuit. Three reactance-coils 10, 11, and 12 are connected in Y across the three phases of the system, the center of the Y 15 forming a neutral point for the system. From the center of the Y a conductor leads to the terminal 13, which is the positive terminal for delivering the direct current. The carbon plates 5 and 6 are both connected to the terminal 14, which serves as the negative terminal for delivering direct current. With the arrangement described the terminal 13 is always positive to the terminal 14 irrespective of the alternations across the three phases, and the current-flow of each phase is as follows: When the current-flow of the line conductor 7 is positive, the aluminium plate 2 will be charged positively, and since the current cannot leave the plate, because of the formation of the oxid film, it will pass down through the reactance-coil 10 to the neutral point at the center of the Y, and thus out to terminal 13, then through the load to terminal 14, and then to the carbon plates 5 and 6, from which it will pass through the electrolyte to the aluminium plates 3 and 4, and then to the line-wires 8 and 9. Similarly the current from the line-wire 8 will pass to the aluminium plate 3, but being unable to leave the plate will pass on through the reactance-coil 11 to the neutral point at the center of the Y, then to terminal 13, through the load, to terminal 14, then to plates 5 and 6 and through the solution to plates 2 and 4, and back to the line. In each case the path of the current will be through one reactance-coil and then through the electrolyte back to the line, the path through the electrolyte offering less impedance to the returning current than the second reactance-coil, by which it is paralleled. Both surfaces of the carbon plates 5 and 6 are effective for delivering current through the cell to the aluminium plates 2, 3, and 4, the quantity of current flowing from any particular plate at any instant depending upon the phase relations in the line-wires at that instant. By making the electrodes flat they may be placed closely together, thereby decreasing the internal resistance of the cell, and consequently improving the efficiency of the system.

Figure 3:
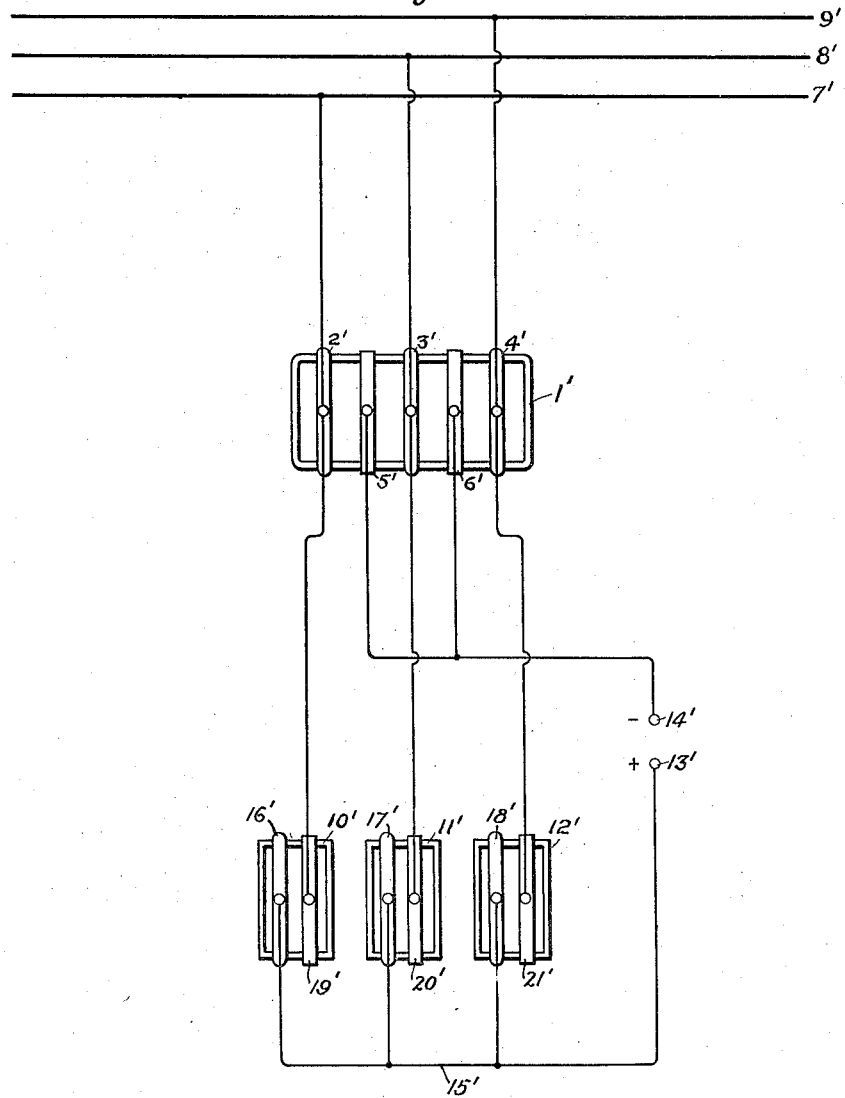

In the modification shown in Fig. 3 reactance-coils are dispensed with, and a neutral point is obtained by connecting three asymmetric cells 10', 11', and 12' in Y between the line conductors. Each of these cells comprises a carbon plate and an aluminium plate, the three carbon plates being connected directly to the line conductors and the three aluminium plates being connected to the neutral conductor 15', from which connection is made to the external or load circuit. The main rectifying-cell 1' is in all respects similar to the cell 1, (shown in Fig. 1,) and the only change in the system consists in the substitution of the three asymmetric cells 10', 11', and 12' for the three reactance-coils 10, 11, and 12 for the purpose of securing a neutral point.

With the arrangement shown in Fig. 3 the current-flow is as follows: When line conductor 7' is positive, the aluminium plate 2' is charged positively; but as the plate is insulated from the electrolyte by the oxid coating the current passes down to the carbon plate 19', through the electrolyte contained in cell 10', to the aluminium plate 16', then to the neutral conductor 15' and to the positive terminal 13'. The current cannot leave the neutral conductor 15' through the cells 11' and 12', because of the insulating-oxid on the aluminium plates 17' and 18'. Similarly current-flow from the other two line-wires yields a unidirectional current at the terminal 13'.

Other arrangements for securing a neutral point will readily suggest themselves to a person skilled in the art, and this invention is intended to cover, broadly, arrangements in which a neutral point is formed from which unidirectional current will be delivered, the return-path for the current being through asymmetric conductors to the several line-wires of the system.

While the plates 2, 3, and 4 are herein described as being composed of aluminium, it is well known that the asymmetric effect will occur if the plates are made of certain alloys of aluminium or even of cadmium and some other metals, and this invention is intended to cover such constructions. The plates 5 and 6 may also be made of other material than carbon, and this invention is intended to cover such variations. Likewise the composition of the electrolyte may vary, as it is well known that many aqueous and non-aqueous solutions, as well as certain fused salts, will cause the formation of the insulating-oxid on the anode-plate and produce asymmetrical results.

What I claim as new, and desire to secure by Letters Patent of the United States, is—

1. Means for rectifying three-phase alternating current comprising devices connected in Y between the three line conductors, three electrodes connected respectively with the line conductors, an electrolyte in contact with said three electrodes, two additional electrodes in said electrolyte, each of said additional electrodes being interposed between two of said first-mentioned electrodes, and means for connecting said additional electrodes to the center of said Y.

2. Means for rectifying three-phase alternating current comprising reactance-coils connected respectively with the three line conductors, said coils meeting at a common point, three electrodes connected respectively with the line conductors, an electrolyte in contact with said electrodes, additional electrodes in said electrolyte, and means for connecting said additional electrodes to said common point.

3. Means for rectifying three-phase alternating current comprising three reactance-coils connected in Y between the three line conductors, three electrodes connected respectively with the line conductors, an electrolyte in contact with said three electrodes, two additional electrodes in said electrolyte, each of said additional electrodes being interposed between two of said first-mentioned electrodes, and means for connecting said additional electrodes to the center of said Y.

In witness whereof I have hereunto set my hand this 12th day of August, 1904.

WILLIAM S. ANDREWS.

Witnesses:
BENJAMIN B. HULL,
HELEN ORFORD.